United States Patent
Nammi et al.

(10) Patent No.: US 11,070,254 B2
(45) Date of Patent: Jul. 20, 2021

(54) DECODING DATA IN NEW RADIO ULTRA-RELIABLE LOW LATENCY COMMUNICATIONS WITH MULTIPLE TRANSMISSION POINTS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/366,213

(22) Filed: Mar. 27, 2019

(65) Prior Publication Data

US 2020/0106486 A1    Apr. 2, 2020

Related U.S. Application Data

(60) Provisional application No. 62/739,010, filed on Sep. 28, 2018.

(51) Int. Cl.
*H04B 7/024* (2017.01)
*H04L 5/00* (2006.01)
(Continued)

(52) U.S. Cl.
CPC ........... *H04B 7/024* (2013.01); *H04B 7/0673* (2013.01); *H04L 1/1816* (2013.01); *H04L 1/1845* (2013.01); *H04L 5/0035* (2013.01)

(58) Field of Classification Search
CPC ........ H04B 7/06; H04B 7/024; H04B 7/0408; H04B 7/0617; H04B 7/0673; H04L 1/18;
(Continued)

(56) References Cited

U.S. PATENT DOCUMENTS

2015/0257073 A1* 9/2015 Park ................... H04B 7/0408
370/331
2018/0270835 A1   3/2018 Abedini et al.
(Continued)

FOREIGN PATENT DOCUMENTS

WO    2018059306 A1    4/2018
WO    2018064182 A1    4/2018
(Continued)

OTHER PUBLICATIONS

Mahmood, et al., "Radio Resource Management Techniques for eMBB and mMTC services in 5G Dense Small Cell Scenarios," In 2016 IEEE 84th Vehicular Technology Conference (VTC—Fall) IEEE. DOI: 10.1109/VTCFall.2016.7881187, 6 pages.
(Continued)

*Primary Examiner* — Shawkat M Ali
(74) *Attorney, Agent, or Firm* — Amin, Turocy & Watson, LLP

(57) ABSTRACT

Described is a technology to reduce the interference between two or more transmit receive (Tx/Rx) points (TRPs) and improve the reliability for New Radio ultra reliable low latency communication (NR URLLC) applications. The technology operates in one aspect at a network node, and in another aspect at a user equipment. If a network device decides to use packet duplication, the network device can indicate duplication to the user equipment. The network device can send duplicate copies, e.g., via two different antenna panels, or can send one copy and coordinate with another network device (e.g., another cell) to send the other copy. When the user equipment receives the copies, the user equipment combines the data, e.g., via soft combining or concatenation into combined data, and decodes the combined data. Weights, such as corresponding to channel
(Continued)

quality from each transmit source, can be used as factors in the combining of the data.

20 Claims, 13 Drawing Sheets

(51) Int. Cl.
  *H04L 1/18* (2006.01)
  *H04B 7/06* (2006.01)
(58) Field of Classification Search
  CPC ....... H04L 1/1816; H04L 1/1845; H04L 5/00; H04L 1/0035; H04L 27/26; H04W 24/10; H04W 27/04; H04W 36/00; H04W 36/06; H04W 36/26; H04W 56/00; H04W 72/04; H04W 88/02
  USPC ........ 370/255, 329, 331, 334, 339; 375/219, 375/260, 262, 267, 295, 316
  See application file for complete search history.

(56) References Cited

U.S. PATENT DOCUMENTS

| | | | |
|---|---|---|---|
| 2018/0098250 A1* | 4/2018 | Vrzic | H04W 36/18 |
| 2018/0115990 A1* | 4/2018 | Abedini | H04L 5/0051 |
| 2018/0063835 A1 | 9/2018 | Chen et al. | |
| 2018/0262311 A1 | 9/2018 | Wang et al. | |
| 2018/0270880 A1 | 9/2018 | Hosseini et al. | |
| 2018/0279330 A1 | 9/2018 | Hong et al. | |
| 2019/0103951 A1* | 4/2019 | Park | H04L 1/0061 |
| 2019/0222279 A1* | 7/2019 | Xi | H04W 72/00 |

FOREIGN PATENT DOCUMENTS

| | | |
|---|---|---|
| WO | 2018084521 A1 | 5/2018 |
| WO | 2018097947 A2 | 5/2018 |
| WO | 2018121222 A1 | 7/2018 |
| WO | 2018128565 A1 | 7/2018 |
| WO | 2018129017 A2 | 7/2018 |
| WO | 2018129325 A1 | 7/2018 |
| WO | 2018137707 A1 | 8/2018 |
| WO | 2018143857 A1 | 8/2018 |
| WO | 2018170847 A1 | 9/2018 |
| WO | 2018172382 A1 | 9/2018 |
| WO | 2018174775 A1 | 9/2018 |
| WO | 2018175420 A1 | 9/2018 |
| WO | 2018177283 A1 | 10/2018 |
| WO | 2018177363 A1 | 10/2018 |
| WO | 2018187224 A1 | 10/2018 |

OTHER PUBLICATIONS

Popovski, "Ultra-Reliable Communication in 5G Wireless Systems," arXiv:1410.4330v1 [cs.IT] Oct. 16, 2014, 6 pages.
Alvarez, et al., "Interference Coordination for 5G New Radio," Interference Coordination for 5G New Radio. I E E E Wireless Communications Magazine, (17), 1-7. DOI: 10.1109/MWC.2017. 1600441, 8 pages.

* cited by examiner

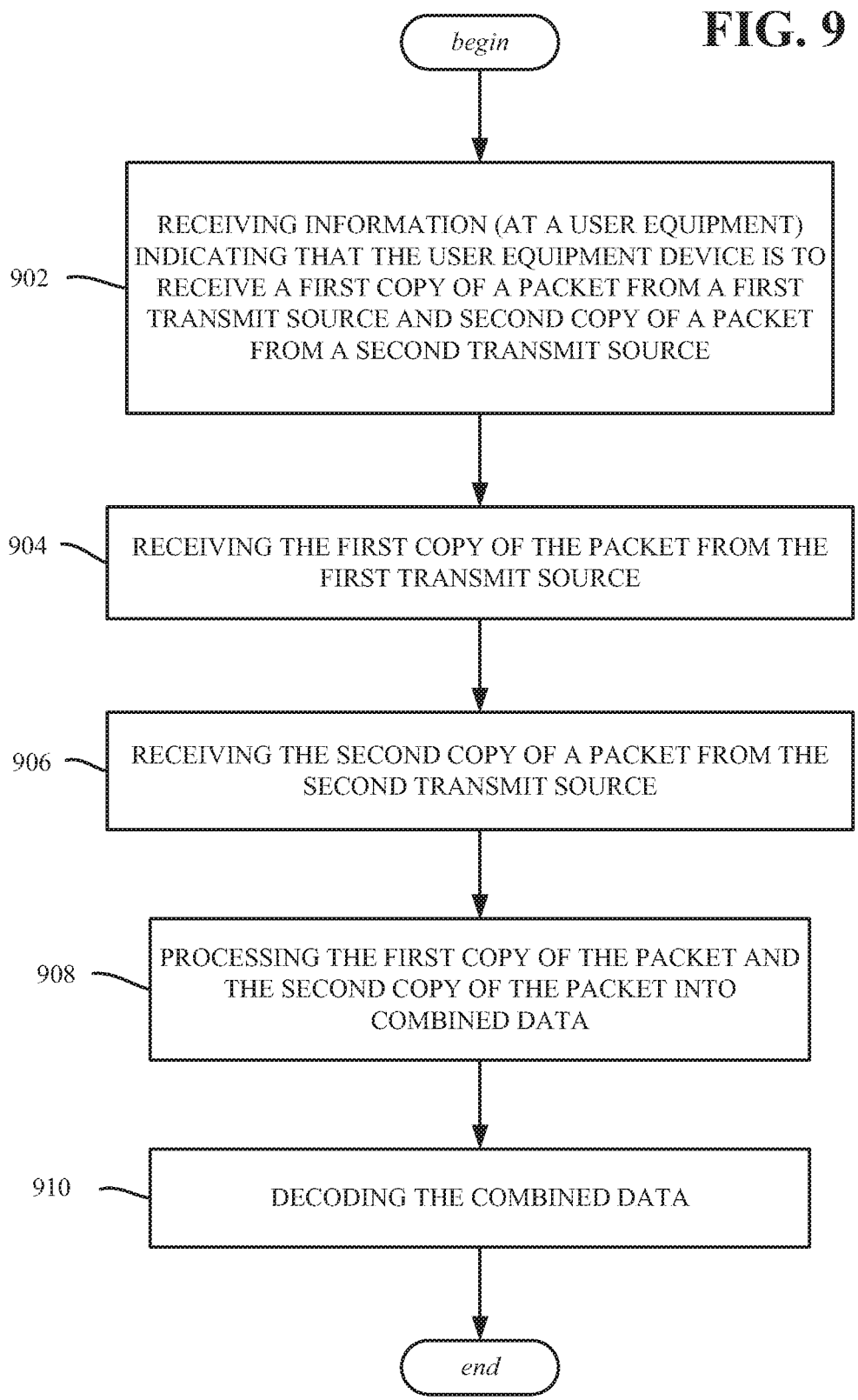

DECODING DATA IN NEW RADIO ULTRA-RELIABLE LOW LATENCY COMMUNICATIONS WITH MULTIPLE TRANSMISSION POINTS

CROSS-REFERENCE TO RELATED APPLICATIONS

This application is a non-provisional of U.S. Provisional Patent Application No. 62/739,010, filed on Sep. 28, 2018 entitled "DECODING DATA IN NEW RADIO ULTRA-RELIABLE LOW LATENCY COMMUNICATIONS WITH MULTIPLE TRANSMISSION POINTS." The entirety of the aforementioned application is hereby incorporated herein by reference.

TECHNICAL FIELD

The subject application is related to wireless communication systems, and, for example, to scheduling data in wireless communication systems for New Radio ultra reliable low latency communication (NR URLLC) systems in which multiple transmission points are present.

BACKGROUND

In NR URLLC, reliability of the packets is significant. For example, if a first transmit receive (Tx/Rx) point (TRP) is transmitting a packet for URLLC, and a second TRP transmits another packet for URLLC/eMBB (URLLC/enhanced mobile broadband), then the second TRP transmission causes interference to the first transmission. In this case the reliability of the URLLC transmission is reduced.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 9 illustrates example operations of a user equipment device with respect to combining duplicate data packets for decoding, in accordance with various aspects and embodiments of the subject disclosure.

DETAILED DESCRIPTION

Various aspects described herein are directed towards a technology to reduce the interference between two or more transmit receive (Tx/Rx) points (TRPs) and improve the reliability for New Radio ultra reliable low latency communication (NR URLLC) applications. The described technology operates in one aspect at a network node, and in another aspect at a user equipment (UE) for transmitting and receiving data for URLLC applications.

To this end, in one or more implementations, the network (a network device) checks whether the user equipment is capable of receiving URLLC transmissions (based on UE category or capability) and decides whether to duplicate the packets from two TRPs (assuming the TRPs are co-located). If the network device decides to use packet duplication, the network device decides whether or not to indicate duplication to the user equipment to indicate duplication to the user equipment. Note that the two TRPs can use the same resources or different resources. Similarly, the network can use different ports from the two TRPs.

In one embodiment, the network device will indicate to the UE that the packets are duplicated based on a scheduling decision. For example, if both the TRPs use the same code rate for packet transmission to the same user equipment, then the network indicates to the user equipment that the current transmission from the TRPs is duplicated.

Figure 1:
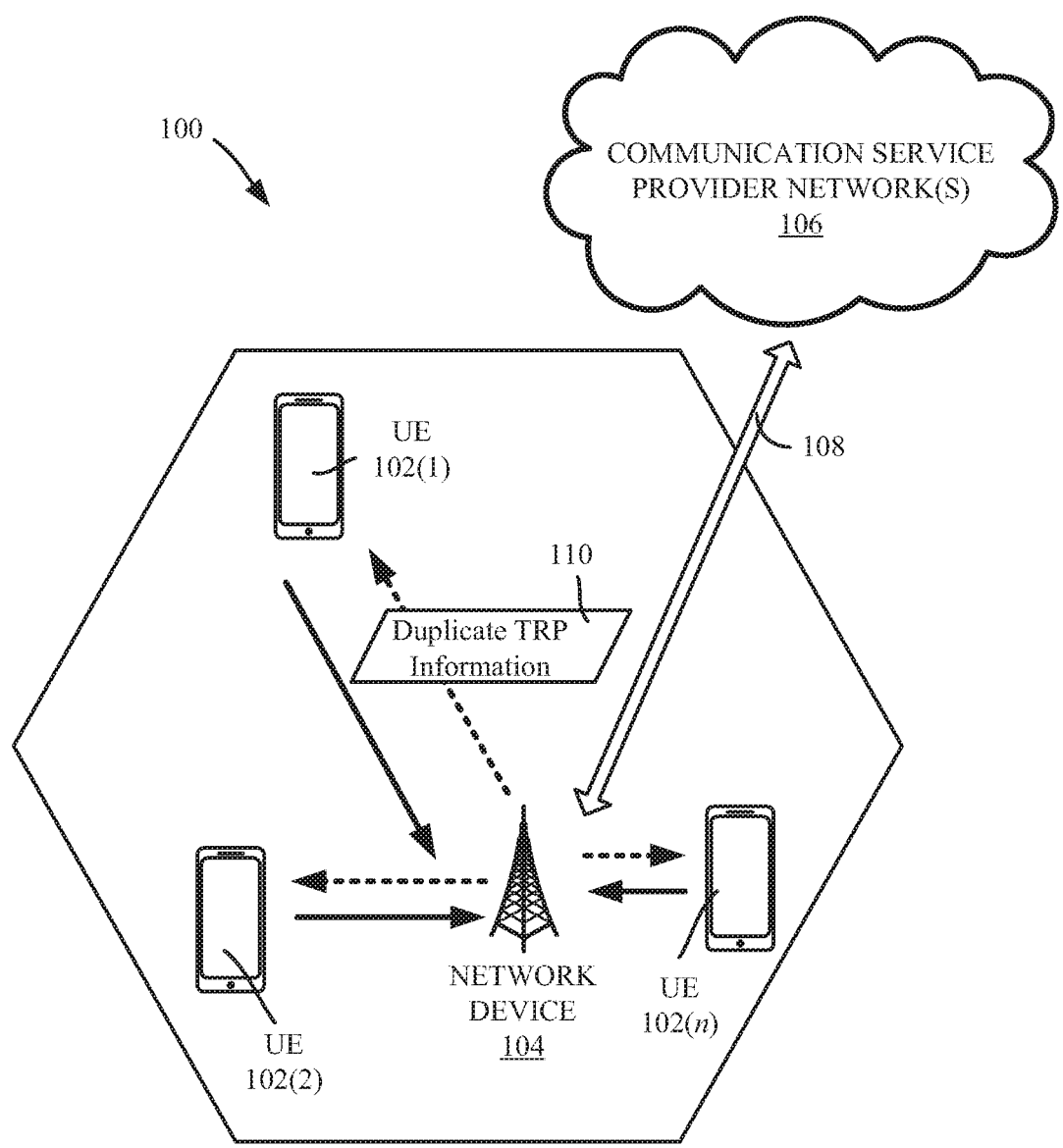
FIG. 1 illustrates an example wireless communication system in which a user equipment receives information with respect to duplicate packets from a network device, in accordance with various aspects and embodiments of the subject disclosure.

FIG. 1 illustrates an example wireless communication system 100 in accordance with various aspects and embodiments of the subject technology. In one or more embodiments, the system 100 can comprise one or more user equipments, e.g., UEs 102(1)-102(n).

In various embodiments, the system 100 is or comprises a wireless communication network serviced by one or more wireless communication network providers. In example embodiments, a UE 102 can be communicatively coupled to the wireless communication network via a network device 104 (e.g., network node). The network device 104 can communicate with the user equipment (UE), thus providing connectivity between the UE and the wider cellular network.

In example implementations, each UE such as the UE 102(1) is able to send and/or receive communication data via a wireless link to the network device 104. The dashed arrow lines from the network device 104 to the UE 102 represent downlink (DL) communications and the solid arrow lines from the UE 102 to the network device 104 represents uplink (UL) communications.

The system 100 can further include one or more communication service provider networks 106 that facilitate providing wireless communication services to various UEs, including UES 102(1)-102($n$), via the network device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., a UE 102 and the network device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Another concept is that of the rank of the transmission. In multiple antenna techniques, the incoming data can be split to be transmitted through multiple antennas, wherein each data stream processed and transmitted through an antenna is referred to as a transmission layer. The number of transmission layers is typically the number of transmit antennas. The data can be split into several parallel streams, where each stream contains different information. In another type, the incoming data is duplicated and each antenna transmits the same information. The term spatial layer refers to a data stream that includes information not included at the other layers. The rank of the transmission is equal to the number of spatial layers in an LTE spatial multiplexing transmission, that is, equals the number of different transmission layers transmitted in parallel. Even though the information in each layer may be manipulated in different ways by mathematical operations, when the operations do not change the information transmitted, a transmitter can be referred to as operating as a rank-1 transmitter. In a multi-antenna transmitter, different pieces of information are transmitted in parallel simultaneously in up to four different layers; a transmitter transmitting different information in parallel using four layers operates as a rank-4 transmitter.

In the example of FIG. 1, as described herein, for data channel transmissions, a user equipment (e.g., 102(1)) receives information 110 as to transmission of two duplicate copies of a transport block/data packet from two different transmission sources/TRPs, e.g., two different antenna panels or two different transmission points, each transmission source corresponding to a different cell. Note that if not notified, the user equipment will individually decode each transport block instance and treat the duplicate transport blocks as interfering. Instead, by being notified that the transport blocks are intended to comprise the same data, the duplicated transport blocks can be combined (e.g., soft combined or concatenated as described herein) before decoding, with the combined data decoded once.

Figure 2:
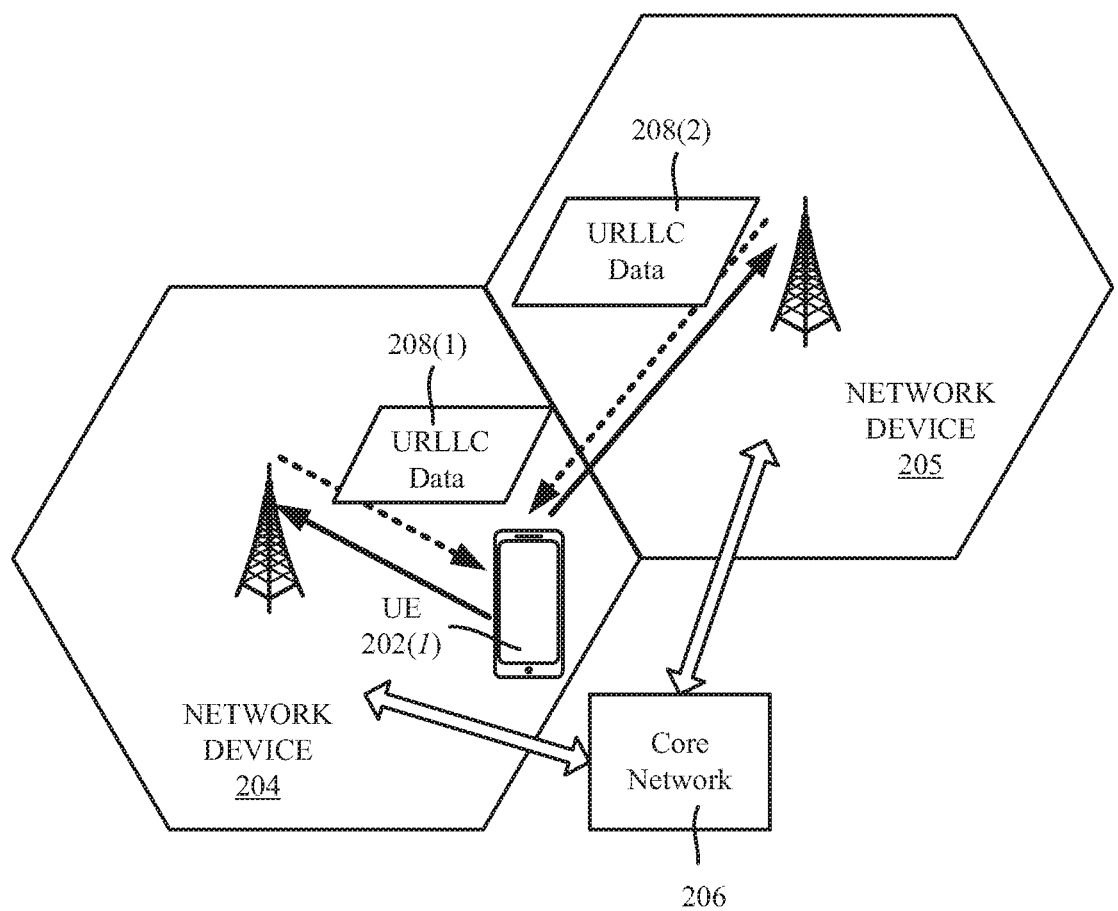
FIG. 2 illustrates an example wireless communication system in which a network device coordinates with another network device to send duplicate data to a user equipment, in accordance with various aspects and embodiments of the subject disclosure.

FIG. 2 is an example embodiment in which two transmission points correspond to two network devices 204 and 205 corresponding to separate (e.g., adjacent) cells by which a user equipment 202(1) can receive downlink data and transmit uplink data. The network device 204 can communicate with the network device 208 via the core network 206, including, for example to coordinate scheduling of a multiple (duplicate) transmission to the user equipment. The duplicated transport block transmissions are represented in FIG. 2 via URLLC data instances/copies represented by the blocks labeled 208(1) and 208(2).

Figure 3:
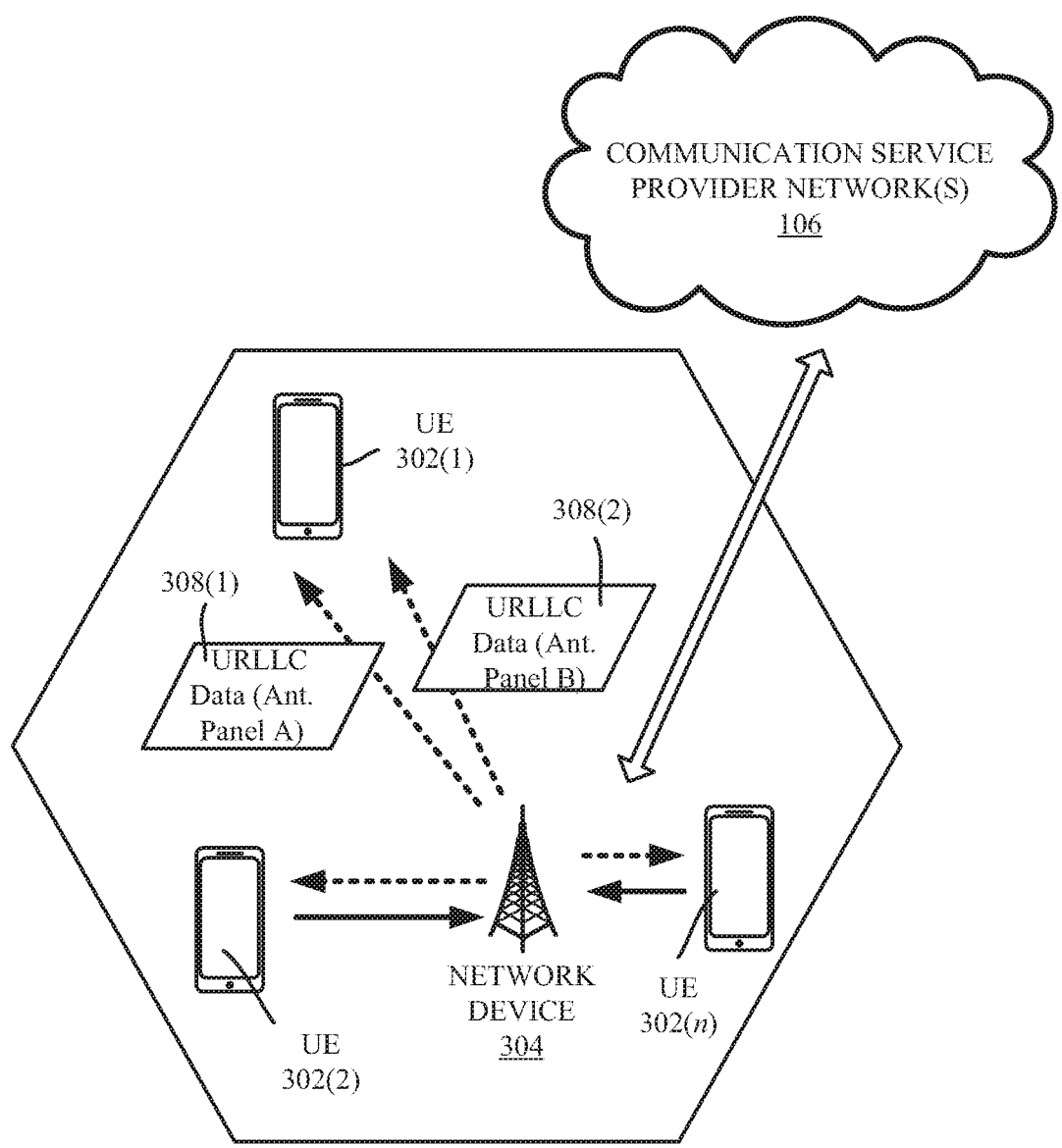
FIG. 3 illustrates an example wireless communication system in which a user equipment receives duplicate packets from different antenna panels of a network device, in accordance with various aspects and embodiments of the subject disclosure.

FIG. 3 is an example embodiment in which two transmission points correspond to two different antenna panels of a network device 304 by which a user equipment 302(1) can receive downlink data and transmit uplink data. The duplicated transport block transmissions are represented in FIG. 3 via URLLC data instances/copies represented by the blocks labeled 308(1) and 308(2).

In general, NR needs to satisfy various services, including eMBB, which is mainly for high broadband applications where the data rate is the main criteria; URLLC, which is mainly for ultra-reliable communications where the packet error rate of $10^{-5}$ is specified with less delay; and mMTC, which is mainly for connecting machine type of communications, where the number of devices is a main criteria.

A typical message sequence for downlink data transfer in 5G systems (called transmission scheme 1) uses pilot or reference signals, from which the UE computes the channel estimates and then computes the parameters needed for CSI (channel state information) reporting. A CSI report comprises, for example, a channel quality indicator (CQI), preceding matrix index (PMI), rank information (RI), and so on The CSI report is sent to the gNodeB via a feedback channel either on a periodic basis or on-demand-based CSI, i.e., aperiodic CSI reporting. The gNodeB scheduler uses this information in choosing the parameters for scheduling of this particular UE. The gNodeB sends the scheduling parameters to the UE in the (physical) downlink control channel called PDCCH. After that actual data transfer takes place from gNodeB to the UE.

The uplink control channel carries information about HARQ-ACK (hybrid automatic repeat request acknowledgement) information corresponding to the downlink data transmission, and channel state information.

Figure 4:
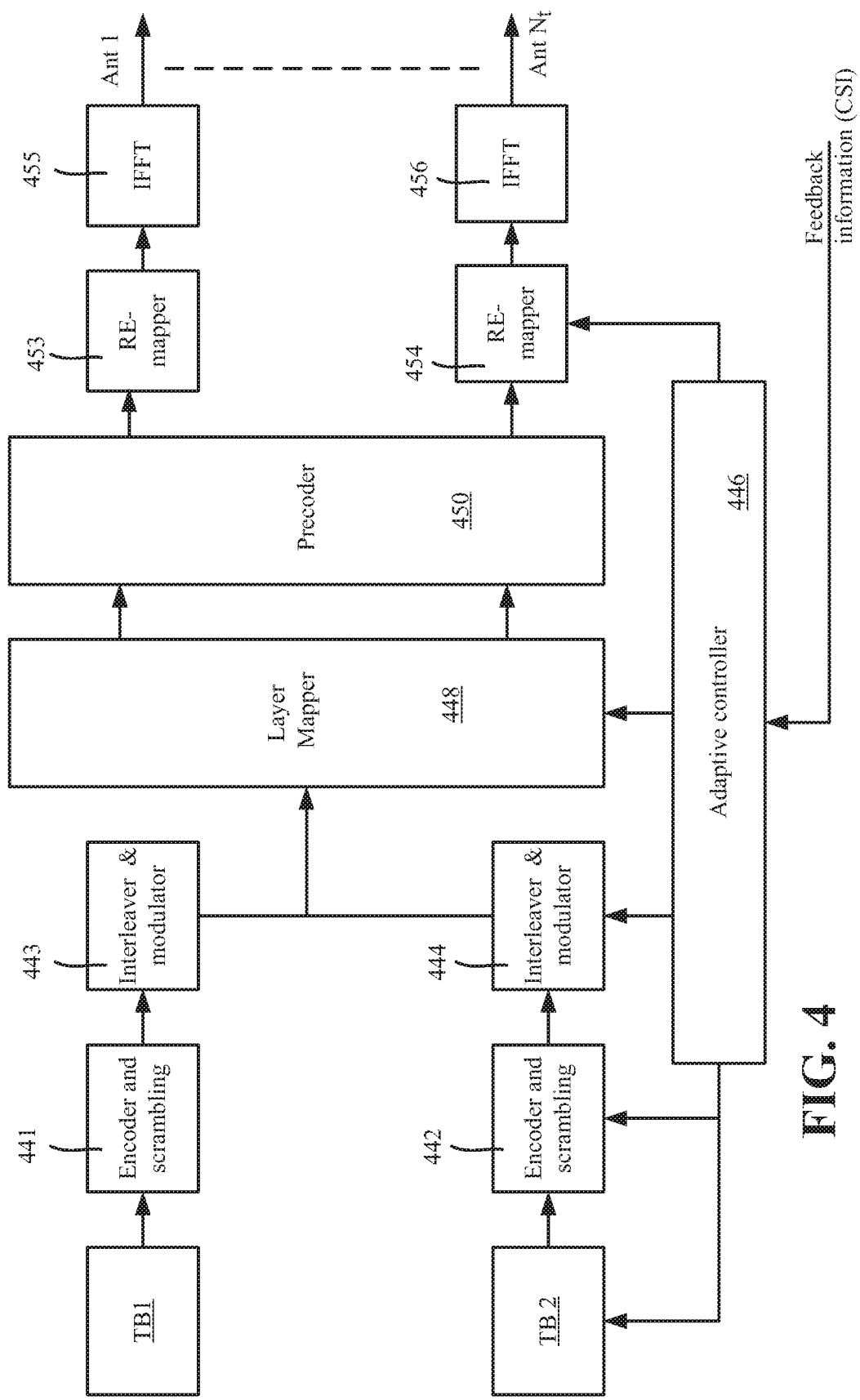
FIG. 4 is an example representation of a coding chain for a physical downlink shared channel (PDSCH) transmitter, in accordance with various aspects and embodiments of the subject disclosure.

With respect to a coding chain for PDSCH, FIG. 4 shows the transmission side of a MIMO communication system with Nt transmit antennas. There are up to 2 transport blocks, e.g., TB1 and TB2, where the number of transport blocks is equal to one when the number of layers is less than or equal to 4. If the number of layers is more than 4, then 2 transport blocks are transmitted. The CRC bits are added to each transport block and passed to the channel encoder, e.g., blocks 441 and 442, which also represent scrambling. Low density parity check codes (LDPC) is the FEC (forward error correction) for NR. The channel encoder adds parity bits to protect the data. After encoding the data stream is scrambled with user-specific scrambling. Then the stream is passed through an interleaver and modulator (blocks 443 and 444). The interleaver size is adaptively controlled by puncturing to increase the data rate. The adaptation is done by using the information from the feedback channel, for example channel state information sent by the receiver. The interleaved data is passed through a symbol mapper (modulator). The symbol mapper is controlled by an adaptive controller 446. After the modulator, the streams are passed through a layer mapper 448 and a precoder 450. The resultant symbols are mapped (blocks 453 and 454) to the resources elements in the time-frequency grid of OFDM. The resultant streams are then passed through IFFT block (blocks 455 and 456). Note that the IFFT block is needed necessary for some communication systems that implement OFDMA as the access technology (e.g., 5G, LTE/LTE-A); in other systems it can be different, and is dependent on the multiple access system. The encoded stream is then transmitted through the respective antenna.

Figure 5:
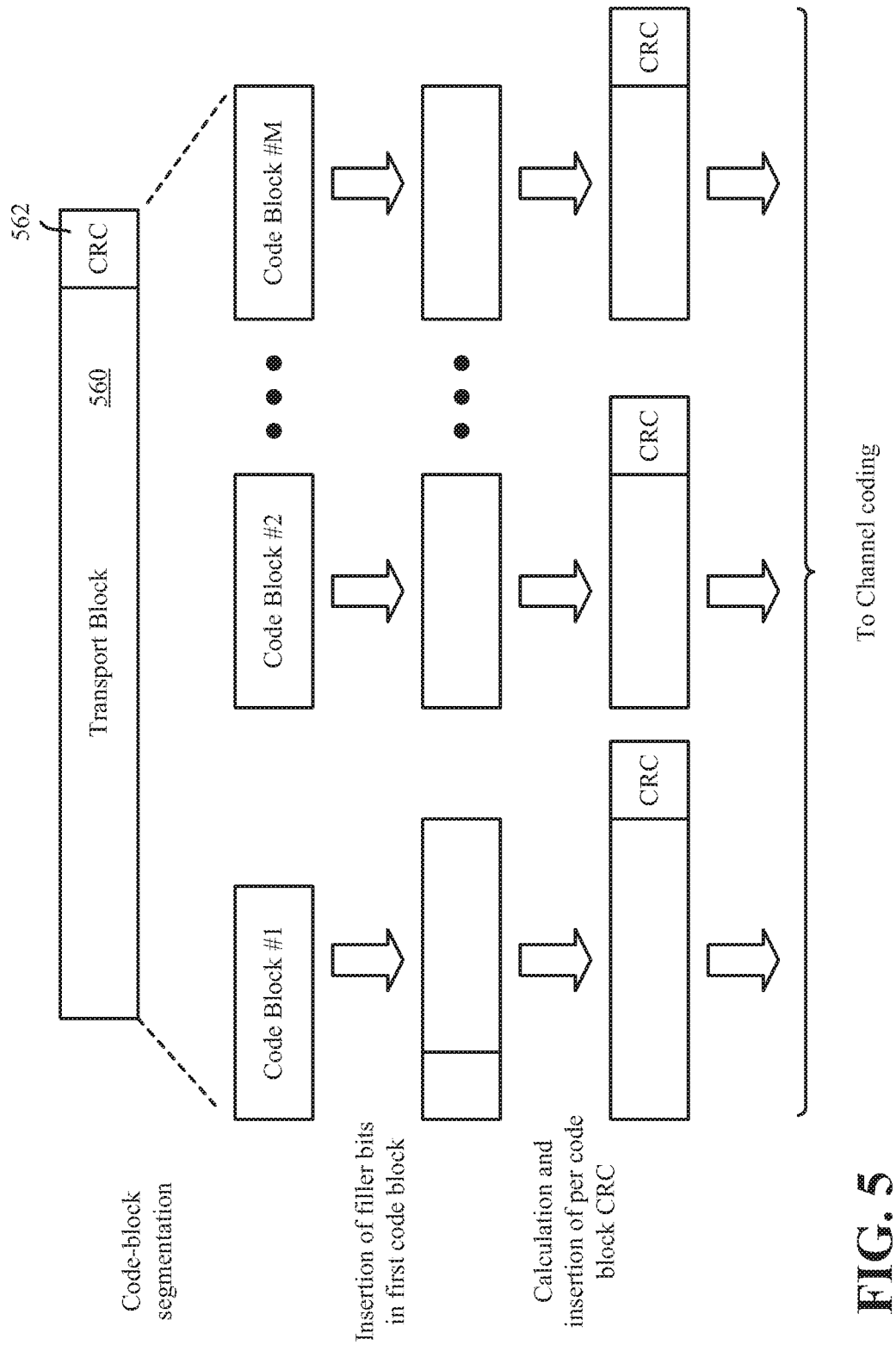
FIG. 5 is an example representation of codeblock segmentation, in accordance with various aspects and embodiments of the subject disclosure.

With respect to code block segmentation in NR, as generally represented in FIG. 5, for data transmission, the transport block is 560 encoded using LDPC code. In one step of the physical-layer processing, a 24-bit CRC 562 is calculated for and appended to each transport block. The CRC allows for receiver-side detection of errors in the decoded transport block. The corresponding error indication can, for example, be used by the downlink hybrid-ARQ protocol as a trigger for requesting retransmissions. If the transport block, including the transport-block CRC, exceeds the maximum code-block size (8448 for base graph 2 and 3840 for Base graph 2), code-block segmentation is applied before the LDPC coding. Code-block segmentation implies that the transport block is segmented into smaller code blocks, the sizes of which should match the set of code-block sizes supported by the LDPC coder.

In the case of a single code block when no segmentation is needed, no additional code-block CRC is applied; code-block segmentation is only applied to large transport blocks for which the relative extra overhead due to the additional transport block CRC is small. Information about the transport-block size is provided to the terminal as part of the scheduling assignment transmitted on the PDCCH control channel. Based on this information, the terminal can determine the code-block size and number of code blocks. The terminal receiver can thus, based on the information provided in the scheduling assignment, straightforwardly undo or assemble the code-block segmentation and recover the decoded transport blocks.

Figure 6:
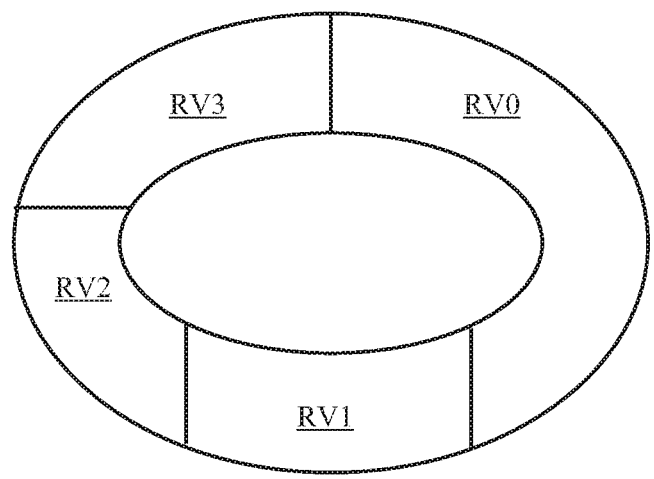
FIG. 6 is an example representation of redundancy versions using a circular buffer, in accordance with various aspects and embodiments of the subject disclosure.

With respect to redundancy version, note that once the information bits are segmented and encoded using LDPC code (either base graph 1 for 2), they need to be rate matched for the transmission. NR uses a circular buffer for rate matching each code block. As an example, the standard defines 4 redundancy versions as shown in FIG. 6. The starting positions of each redundancy version is shown in the following Table:

| | $k_0$ | |
|---|---|---|
| $rv_{id}$ | Base graph 1 | Base graph 2 |
| 0 | 0 | 0 |
| 1 | $\left\lfloor \frac{17N_{cb}}{66Z_c} \right\rfloor Z_c$ | $\left\lfloor \frac{13N_{cb}}{50Z_c} \right\rfloor Z_c$ |
| 2 | $\left\lfloor \frac{33N_{cb}}{66Z_c} \right\rfloor Z_c$ | $\left\lfloor \frac{25N_{cb}}{50Z_c} \right\rfloor Z_c$ |
| 3 | $\left\lfloor \frac{56N_{cb}}{66Z_c} \right\rfloor Z_c$ | $\left\lfloor \frac{43N_{cb}}{50Z_c} \right\rfloor Z_c$ |

In NR, for each transmission, the network needs to inform to the UE which redundancy version it is currently scheduling. This is communicated via the downlink control channel for PDSCH transmission and downlink control channel (grant channel) for uplink data transmission.

Note that all the versions of LDPC codes designed for 5G wireless communications are not self-decodable, where self decodability generally means, for example, if redundancy version is RV0 for one or all re-transmissions, and if the decoder is able to decode the transport block, then it is referred to as a self-decodable redundancy version. Empirical simulations find that redundancy version 0 (RV0) is self-decodable for any code rate and modulation scheme, redundancy version 1 (RV1) is self-decodable low code rates up to 0.45 and any modulation schemes, redundancy version 2 (RV2) is self-decodable low code rates up to 0.5 and any modulation schemes, and redundancy version 3 (RV3) is self-decodable for any code rate and any modulation scheme.

Figure 7:
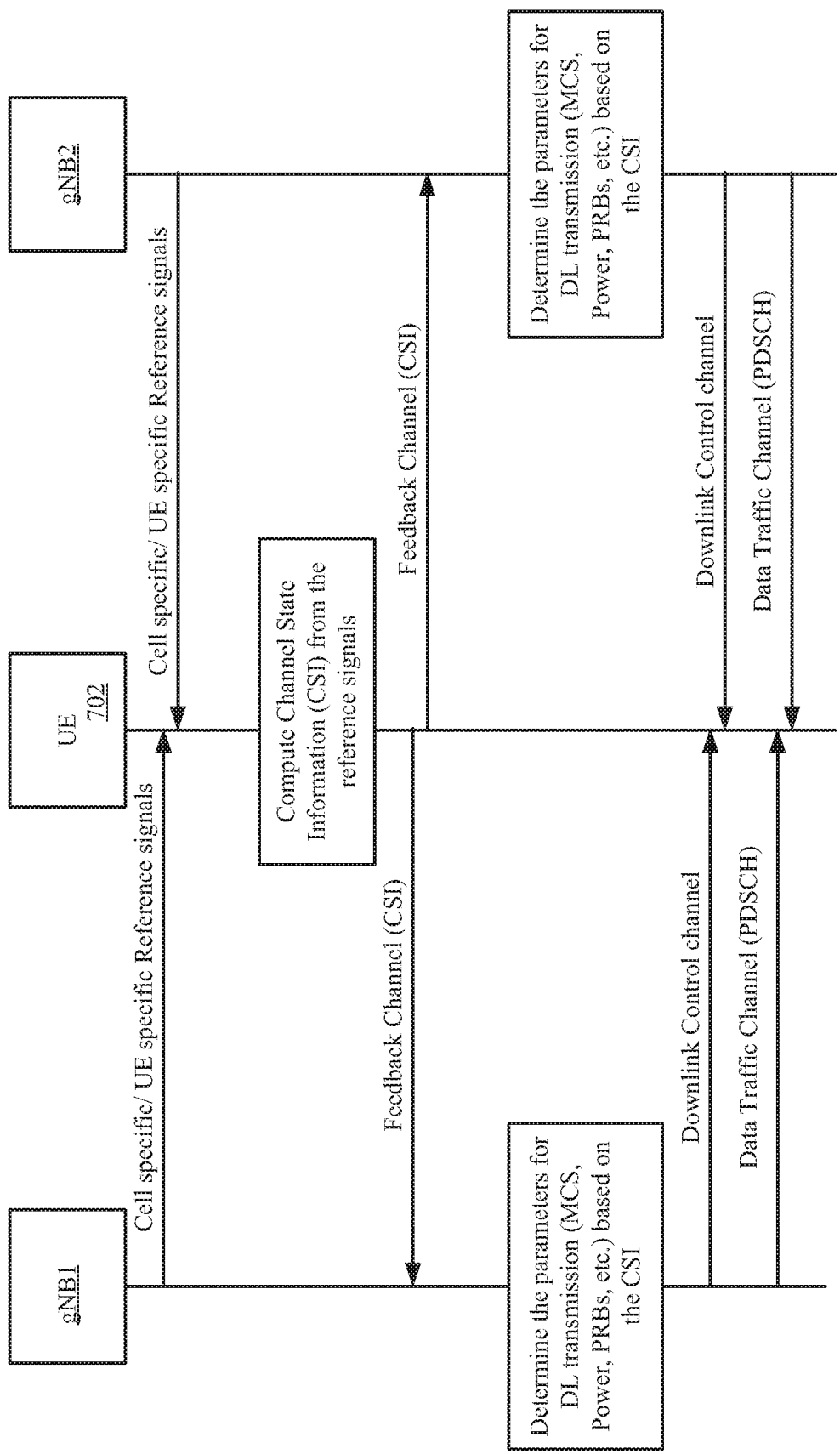
FIG. 7 is an example representation of message sequences between two gNodeBs (or a gNodeB with multiple TRPs) and a user equipment, in accordance with various aspects and embodiments of the subject disclosure.

Turning to aspects related to multiple TRP (transmission/reception or Tx/Rx Point) transmission, FIG. 7 shows a message sequence chart between a gNodeB (gNB1) and a UE 702 with multiple TRPs for downlink data transfer in 5G systems. In general, the same sequence procedure as described above is repeated for the second TRP (gNB2). However, if the TRPs are co-located, then then the scheduling can be optimized by using a single DCI or multiple DCIs.

The technology described herein is generally directed towards using two (or possibly more than two) TRPs to improve the reliability in URLLC applications. In one aspect, at the network node, operations can comprise:
  Obtaining information about the UE capability for URLLC and the packet application
  Decide about duplicating the packets from both the TRPs by coordinating the scheduler
  Decide to indicate to the UE about duplication if the packets are to be duplicated
  Indicate to the UE about duplication of the packets
  Transmitting the data to the UE In one aspect, at the UE, operations can comprise:
  Obtaining information about the duplication of the packets from both the TRPs
  Determine the RV and HARQ process from the DCI
  Decide whether to soft combine the data from the two TRPs or use concatenation based on RV and HARQ of the individual transmission
  Decode the data
  Transmit, to the network node, HARQ-ACK information.

Figure 8A:
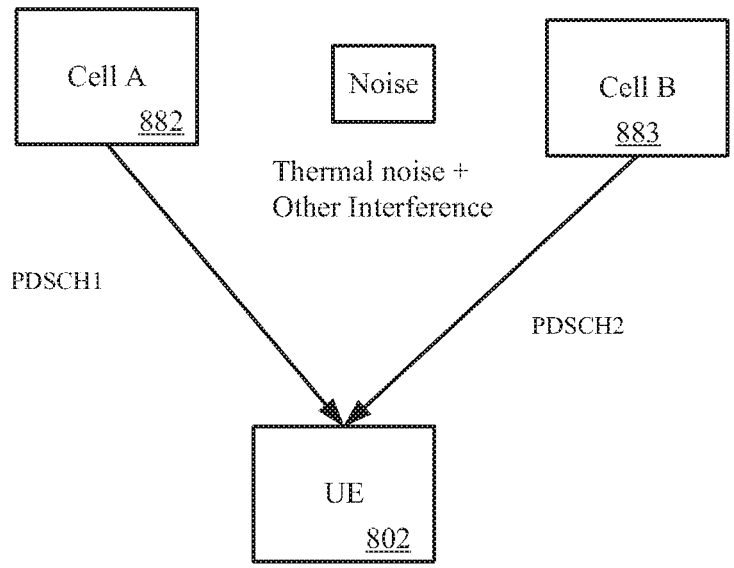
FIGS. 8A and 8B are example representations of scenarios with multiple TRPs configured for data transmission for ultra reliable low latency communication applications, in accordance with various aspects and embodiments of the subject disclosure.
Figure 8B:
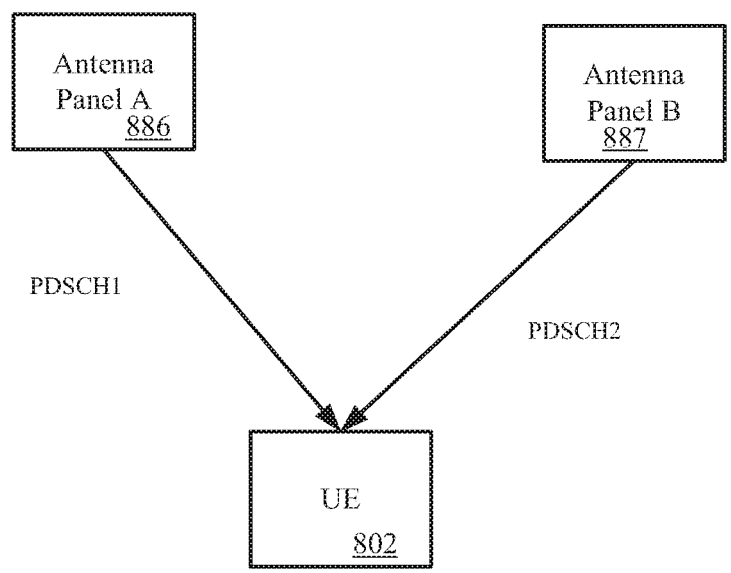

FIGS. 8A and 8B shows typical scenarios with multiple TRP transmission sources 882 and 883 or 886 and 887 to a user equipment (UE) 802 for URLLC applications. The received signal at the UE 802 is given by:

$$r = H^A P_1 x_1^A + H^B P_2 x_2^B + n$$

In one or more implementations, the network checks whether the UE 802 is capable of receiving URLLC transmissions (UE category or capability) and decides whether to duplicate the packets from both of the TRPs (assuming they are co-located). Once it decides to use packet duplication, the network has to decide whether to indicate duplication to the UE. Note that, the two TRPs can use the same resources or different resources. Similarly, the network can use different ports from the two TRPs.

In one embodiment, the network indicates to the UE 802 that the packets are duplicated based on the scheduling decision. For example, if both the TRPs use the same code rate for packet transmission to the same UE, then the network indicates to the UE 802 that the current transmission from the TRPs is duplicated.

Once the UE receives the DCI, the UE determines the contents of the DCI, namely MCS (modulation coding scheme), RV and the indication from the TRP about duplication. If the code rate is same, and the RV is same from both the TRPs, then the UE will soft combine the coded bits (before the FEC decoder) thereby improving the performance of system. Note that soft combining refers to one or more techniques, e.g., two identical data packets are combined to improve the decoding probability, in the case of two TRPS, via spatial incremental redundancy.

In another embodiment, the UE checks the DCI and determines the RV and the indication from the TRP about duplication. If the RV is different from the two TRPS, the UE concatenates the soft bits and use one FEC decoder (similar to the HARQ soft combining in traditional systems). However in this case the soft combining is in the spatial domain rather time domain. Hence significant gains can be obtained by using this approach, thereby improving the reliability.

Note that the network can indicate that packets are duplicated by either explicit signaling (e.g., 1 bit) or by implicit signaling in either of the downlink control channels or by using a single downlink control channel.

Turning to another aspect, soft combining of the packets can be based on the channel quality corresponding to the transmission sources. For example, a first weight can be associated with the first signal-to-noise ratio of a first transmission source, and a second weight can be associated with the second signal-to-noise ratio of a second transmission source. Soft combining can factor in the weights, so that the packet received via the better of the two signals has more weight in the combined data to be decoded.

One or more example aspects are represented in FIG. 9, and can correspond to a user equipment device comprising a processor and a memory that stores executable instructions that, when executed by the processor, facilitate performance of operations and/or components. Example operations comprise operation 902, which represents receiving information indicating that the user equipment device is to receive a first copy of a packet from a first transmit source and second copy of a packet from a second transmit source. Operation 904 represents receiving the first copy of the packet from the first transmit source. Operation 906 represents receiving the second copy of a packet from the second transmit source. Operation 908 represents processing the first copy of the packet and the second copy of the packet into combined data. Operation 910 represents decoding the combined data.

Processing the first copy of the packet and the second copy of the packet into the combined data can comprise soft combining the first copy of the packet and the second copy of the packet into the combined data. Processing the first copy of the packet and the second copy of the packet into the combined data can comprise concatenating the first copy of the packet and the second copy of the packet into the combined data.

Further operations can comprise, determining a first weight based on first channel quality information associated with the first transmit source, determining a second weight based on second channel quality information associated with the second transmit source, and wherein the processing the first copy of the packet and the second copy of the packet into the combined data comprises soft combining first data from the first copy of the packet, based on the first weight, with second data of the second copy of the packet, based on the second weight, into the combined data.

The processing can comprise performing a data combination operation; further operations can comprise determining the data combination operation to perform to obtain the combined data, comprising evaluating a first redundancy version and first hybrid automatic repeat request information associated with a first copy of the packet, and evaluating a second redundancy version and second hybrid automatic repeat request information associated with a second copy of the packet, to determine whether the data combination operation comprises a soft combine operation or a concatenation operation.

The processing can comprise evaluating a first redundancy version associated with a first copy of the data, evaluating a second redundancy version associated with a second copy of the data, and in response to the first redundancy version being determined to match the second redundancy packet, performing a data combination operation by soft combining the first copy of the data with the second copy of the packet to obtain the combined data.

The processing can comprise evaluating a first redundancy version associated with a first copy of the data, evaluating a second redundancy version associated with a second copy of the data, and in response to the first redundancy version being determined to be different from the second redundancy version, performing a data combination operation by concatenating the first copy of the data with the second copy of the data to obtain the combined data.

Figure 10:
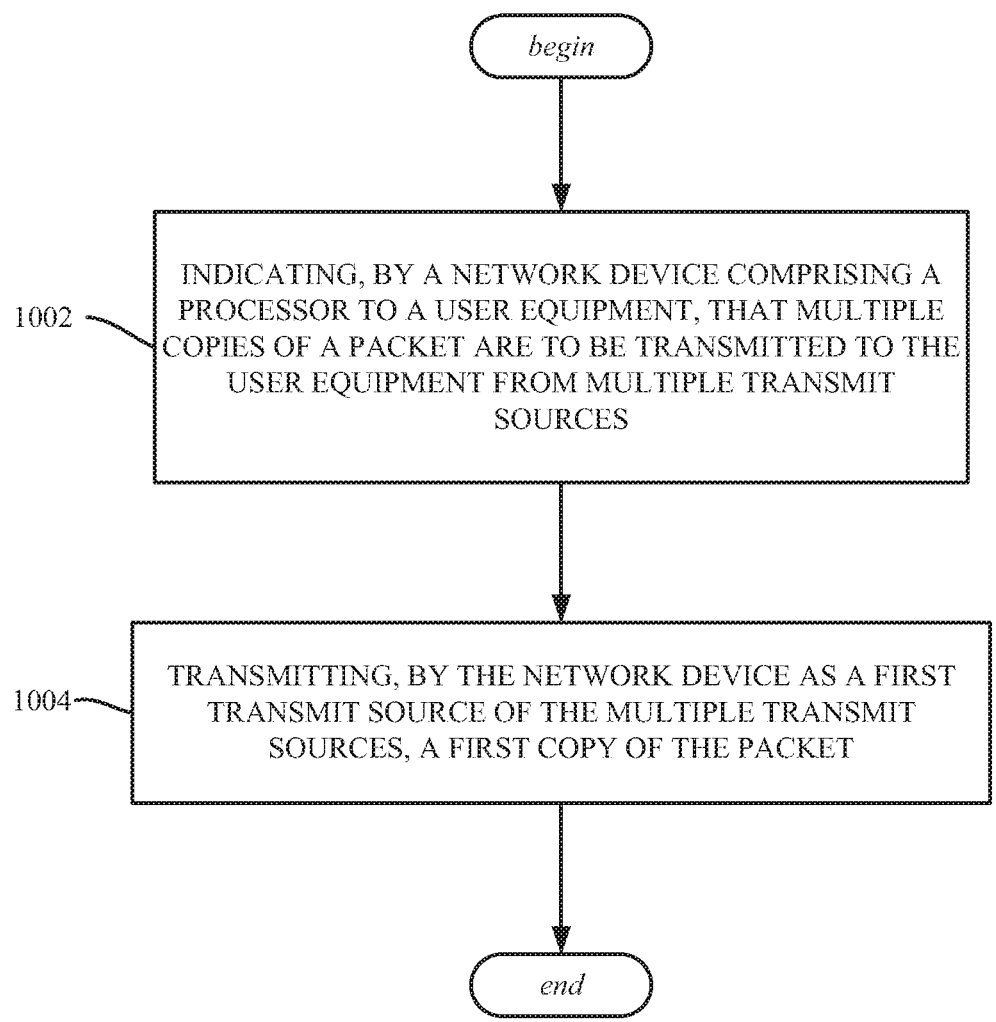
FIG. 10 illustrates example operations of a network device with respect to sending duplicate packets to a user equipment, in accordance with various aspects and embodiments of the subject disclosure.

One or more aspects, such as those implemented in example operations of a method, are shown in FIG. 10 in accordance with various aspects and embodiments of the subject disclosure. Operation 1002 represents indicating, by a network device comprising a processor to a user equipment, that multiple copies of a packet are to be transmitted to the user equipment from multiple transmit sources. Operation 1004 represents transmitting, by the network device as a first transmit source of the multiple transmit sources, a first copy of the packet.

Transmitting the first copy of the packet can comprise transmitting an ultra-reliable low-latency communication transport block data transmission.

The network device can comprise a first antenna panel as the first transmit source and a second antenna panel as a second transmit source; transmitting the first copy of the packet can occur via the first antenna panel; aspects can comprise transmitting, by the network device via the second antenna panel as a second transmit source, a second copy of the packet.

Aspects can comprise coordinating, by the network device, scheduling of the transmitting the first copy of the packet with a second transmission of a second copy of the packet. The network device can comprise a first transmit source comprising a first transmit point corresponding to a first cell; coordinating the scheduling of the second copy of the packet can comprise scheduling the second transmission via a second transmit source comprising a second transmit point corresponding to a second cell.

Figure 11:
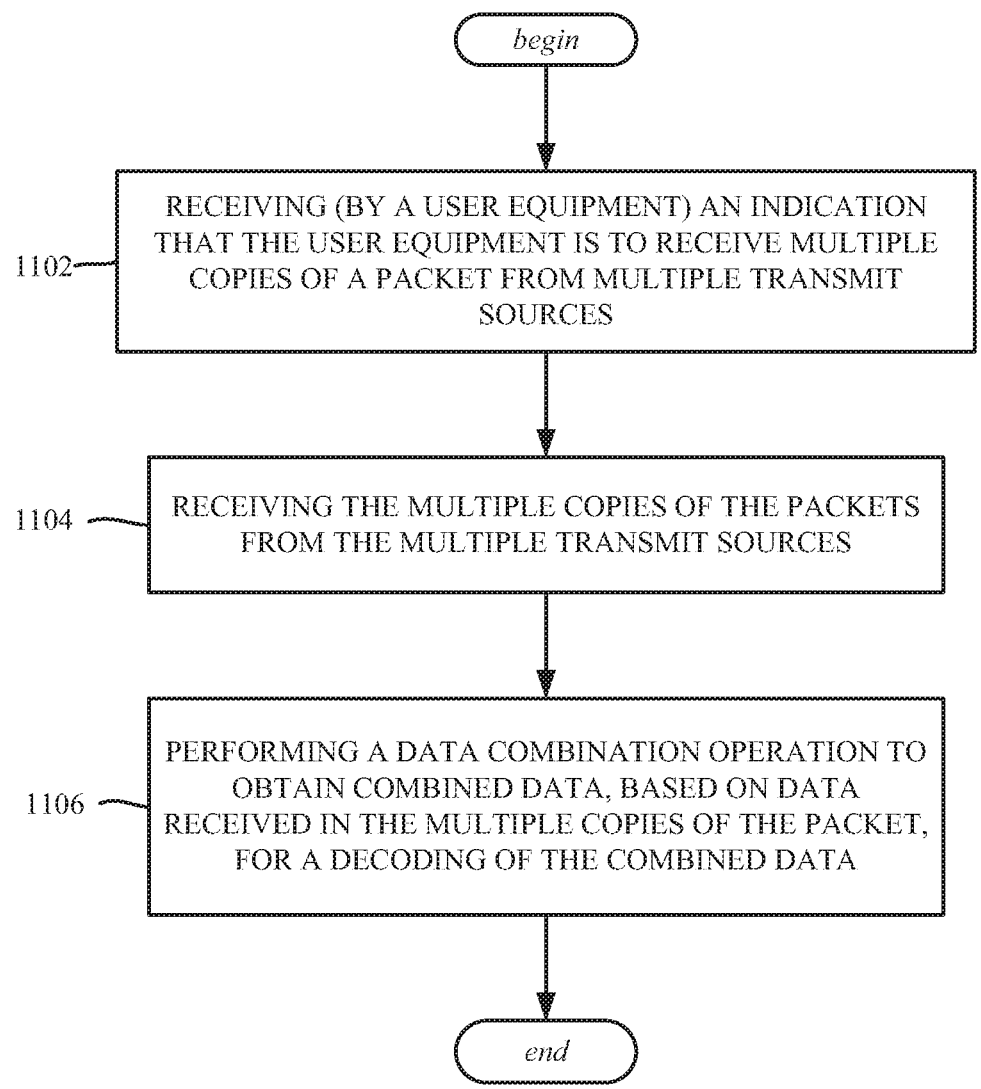
FIG. 11 illustrates example operations of a user equipment device with respect to handling duplicate data packets, in accordance with various aspects and embodiments of the subject disclosure.

One or more aspects, such as implemented in a machine-readable storage medium, comprising executable instructions that, when executed by a processor of a network device of a wireless communication system, facilitate performance of operations, are represented in FIG. 11. Example operations comprise operation 1102, which represents receiving an indication that the user equipment is to receive multiple copies of a packet from multiple transmit sources. Operation 1104 represents receiving the multiple copies of the packets from the multiple transmit sources. Operation 1106 represents performing a data combination operation to obtain combined data, based on data received in the multiple copies of the packet, for a decoding of the combined data.

Further operations can comprise decoding the combined data.

Performing the data combination operation to obtain the combined data can comprise soft combining the multiple copies of the packets into the combined data. Performing the data combination operation to obtain the combined data can comprise concatenating the multiple copies of the packets into the combined data.

Further operations can comprise, evaluating a first redundancy version and first hybrid automatic repeat request information associated with a first copy of the packet, and in response to the first redundancy version being determined to match the second redundancy packet, performing the data combination operation can comprise soft combining the first copy of the data with the second copy of the packet to obtain the combined data, and in response to the first redundancy version being determined to not match from the second redundancy version, performing the data combination operation can comprise concatenating the first copy of the data with the second copy of the data to obtain the combined data.

The multiple transmit sources can comprise a first transmit source and a second transmit source; further operations can comprise determining a first weight based on first channel quality information associated with the first transmit source, and determining a second weight based on second channel quality information associated with the second transmit source; performing the data combination operation can comprise soft combining first data from the first copy of the packet, based on the first weight, with second data of the second copy of the packet, based on the second weight, into the combined data.

Determining the data combination operation to perform to obtain the combined data can comprise evaluating a first redundancy version and first hybrid automatic repeat request information associated with a first copy of the data, and evaluating a second redundancy version and second hybrid automatic repeat request information associated with a second copy of the data, to determine whether the data combination operation comprises a soft combine operation or a concatenation operation.

The multiple transmit sources can comprise a first transmit source and a second transmit source; further operations can comprise determining a first weight based on first channel quality information associated with the first transmit source, and determining a second weight based on second channel quality information associated with the second transmit source; performing the data combination operation can comprise using the first weight and the second weight as factors to obtain the combined data.

As can be seen, there is described a technology that facilitates improved reliability for data channels. Benefits include reducing the power for transmitting the data, using a reduced number of resources for data channels as the number of retransmissions is reduced, and improving a user experience, as the reliability of data transmission is improved and the latency is reduced. These are particularly useful in URLLC communications.

Figure 12:
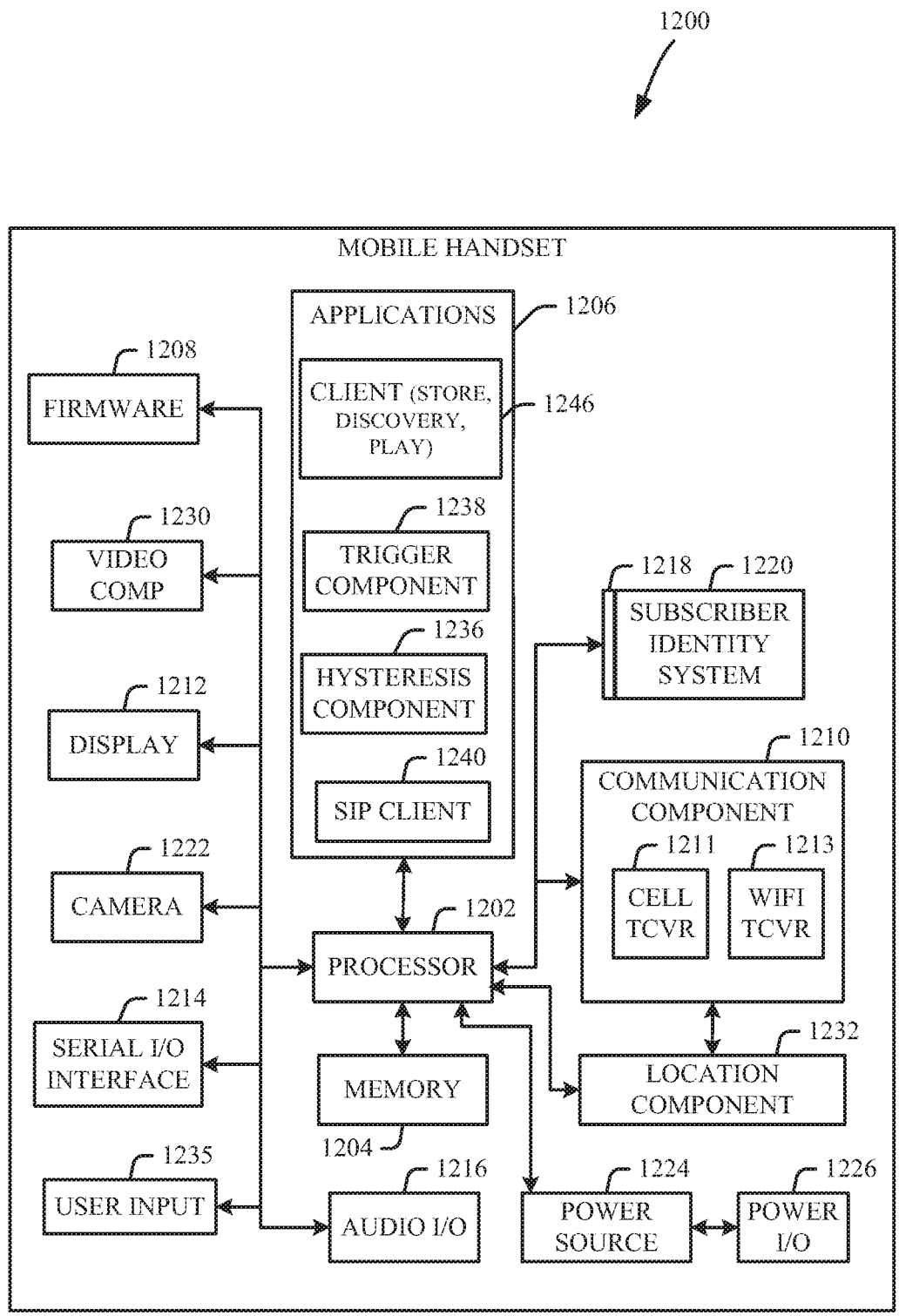
FIG. 12 illustrates an example block diagram of an example user equipment that can be a mobile handset in accordance with various aspects and embodiments of the subject disclosure.

Referring now to FIG. 12, illustrated is an example block diagram of an example mobile handset 1200 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or a decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
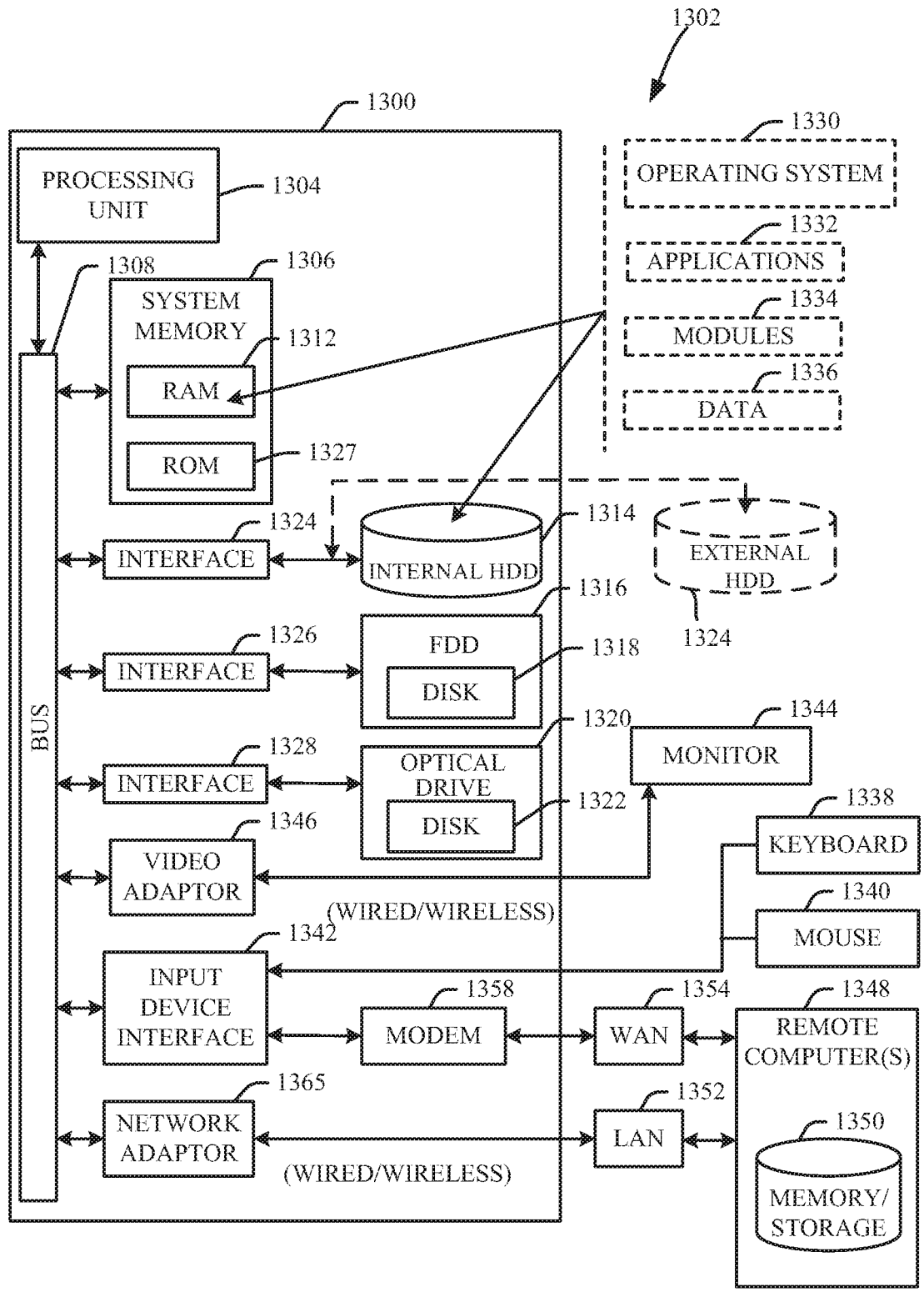
FIG. 13 illustrates an example block diagram of a computer that can be operable to execute processes and methods in accordance with various aspects and embodiments of the subject disclosure.

Referring now to FIG. 13, there is illustrated a block diagram of a computer 1300 operable to execute the functions and operations performed in the described example embodiments. For example, a network node (e.g., network node/device 104, GNB, etc.) may contain components as described in FIG. 13. The computer 1300 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the various embodiments can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1300 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 13 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A user equipment, comprising:
   a processor; and
   a memory that stores executable instructions that, when executed by the processor, facilitate performance of operations, the operations comprising:
   receiving, from network equipment via a downlink control channel, control information comprising an explicit indication that the user equipment is to receive a first copy of a packet from a first transmit source and a second copy of the packet from a second transmit source;
   receiving the first copy of the packet from the first transmit source;
   receiving the second copy of the packet from the second transmit source;
   processing the first copy of the packet and the second copy of the packet into combined data, wherein the processing comprises:
   determining whether to employ soft combining or concatenating to obtain the combined data based on:
   evaluating a first redundancy version and first hybrid automatic repeat request information associated with the first copy of the packet, and evaluating a second redundancy version and second hybrid automatic repeat request information associated with the second copy of the packet; and decoding the combined data.

2. The user equipment of claim 1, wherein processing the first copy of the packet and the second copy of the packet into the combined data comprises the soft combining of the first copy of the packet and the second copy of the packet into the combined data.

3. The user equipment of claim 1, wherein processing the first copy of the packet and the second copy of the packet into the combined data comprises the concatenating of the first copy of the packet and the second copy of the packet into the combined data.

4. The user equipment of claim 1, wherein the operations further comprise, determining a first weight based on first channel quality information associated with the first transmit source, determining a second weight based on second channel quality information associated with the second transmit source, and wherein processing the first copy of the packet and the second copy of the packet into the combined data comprises the soft combining of first data from the first copy of the packet, based on the first weight, with second data of the second copy of the packet, based on the second weight, into the combined data.

5. The user equipment of claim 1, wherein the processing further comprises, in response to the first redundancy version being determined to match the second redundancy version, performing a data combination operation by utilizing the soft combining of the first copy of the packet with the second copy of the packet to obtain the combined data.

6. The user equipment of claim 1, wherein the processing further comprises, in response to the first redundancy version being determined to be different from the second redundancy version, performing a data combination operation by utilizing the concatenating of the first copy of the packet with the second copy of the packet to obtain the combined data.

7. A non-transitory machine-readable medium, comprising executable instructions that, when executed by a processor of a user equipment, facilitate performance of operations, the operations comprising:

receiving, from network equipment via a downlink control channel, an explicit indication that the user equipment is to receive multiple copies of a packet from multiple transmit sources;

receiving the multiple copies of the packets from the multiple transmit sources; and performing a data combination operation to obtain combined data, based on data received in the multiple copies of the packet, for a decoding of the combined data, wherein performing the data combination operation comprises:

selecting the data combination operation from a group of operations consisting of soft combining and concatenating, wherein the selecting is based on a result of:

evaluating a first redundancy version and first hybrid automatic repeat request information associated with a first copy of the packet of the multiple copies of the packet, and evaluating a second redundancy version and second hybrid automatic repeat request information associated with a second copy of the packet of the multiple copies of the packet.

8. The non-transitory machine-readable medium of claim 7, wherein the operations further comprise decoding the combined data.

9. The non-transitory machine-readable medium of claim 7, wherein performing the data combination operation to obtain the combined data comprises the soft combining of the multiple copies of the packets into the combined data.

10. The non-transitory machine-readable medium of claim 7, wherein performing the data combination operation to obtain the combined data comprises the concatenating of the multiple copies of the packets into the combined data.

11. The non-transitory machine-readable medium of claim 7, wherein the operations further comprise:

in response to the first redundancy version being determined to match the second redundancy version, soft combining the first copy of the packet with the second copy of the packet to obtain the combined data, and in response to the first redundancy version being determined not to match the second redundancy version, concatenating the first copy of the packet with the second copy of the packet to obtain the combined data.

12. The non-transitory machine-readable medium of claim 7, wherein the multiple transmit sources comprise a first transmit source and a second transmit source, and wherein the operations further comprise determining a first weight based on first channel quality information associated with the first transmit source, determining a second weight based on second channel quality information associated with the second transmit source, and wherein performing the data combination operation comprises soft combining first data from the first copy of the packet, based on the first weight, with second data of the second copy of the packet, based on the second weight, into the combined data.

13. The non-transitory machine-readable medium of claim 7, wherein the multiple transmit sources comprise a first transmit source and a second transmit source, and wherein the operations further comprise determining a first weight based on first channel quality information associated with the first transmit source, determining a second weight based on second channel quality information associated with the second transmit source, and wherein performing the data combination operation comprises utilizing the first weight and the second weight to obtain the combined data.

14. A method, comprising:

receiving, by a user equipment comprising a processor via a downlink control channel, an explicit indication from network equipment that the user equipment is to receive a first copy of a packet from a first transmit source and second copy of the packet from a second transmit source;

in response to receiving the first copy of the packet from the first transmit source and the second copy of the packet from the second transmit source, combining, by the user equipment, the first copy of the packet and the second copy of the packet into combined data, wherein the combining comprises:

selecting an operation to obtain the combined data from a group consisting of soft combining and concatenating, wherein the selecting is based on:

evaluating a first redundancy version and first hybrid automatic repeat request information associated with the first copy of the packet, and evaluating a second redundancy version and second hybrid automatic repeat request information associated with the second copy of the packet; and decoding, by the user equipment, the combined data.

15. The method of claim 14, wherein the combining comprises the soft combining of the first copy of the packet and the second copy of the packet into the combined data.

16. The method of claim 14, wherein the combining comprises the concatenating of the first copy of the packet and the second copy of the packet into the combined data.

17. The method of claim 14, further comprising:
   determining, by the user equipment, a first weight based on a first signal-to-noise ratio associated with the first transmit source; and
   determining, by the user equipment, a second weight based on second signal-to-noise ratio associated with the second transmit source,
   wherein the combining comprises soft combining first data from the first copy of the packet, based on the first weight, with second data of the second copy of the packet, based on the second weight, into the combined data.

18. The method of claim 14, wherein the combining further comprises:
   in response to the first redundancy version being determined to match the second redundancy version, soft combining the first copy of the packet with the second copy of the packet to obtain the combined data.

19. The method of claim 14, wherein the combining further comprises:
   in response to the first redundancy version being determined not to match the second redundancy version, concatenating the first copy of the packet with the second copy of the packet to obtain the combined data.

20. The method of claim 14, further comprising:
   determining, by the user equipment, a first weight based on first channel quality information associated with the first transmit source; and
   determining, by the user equipment, a second weight based on second channel quality information associated with the second transmit source,
   wherein the combining comprises soft combining first data from the first copy of the packet, based on the first weight, with second data of the second copy of the packet, based on the second weight, into the combined data.

* * * * *